(12) United States Patent
Krieger et al.

(10) Patent No.: US 7,759,816 B2
(45) Date of Patent: Jul. 20, 2010

(54) CIGARETTE LIGHTER ADAPTER DEVICE THAT INTERFACES WITH AN EXTERNAL DEVICE VIA A PORT INTERFACE

(75) Inventors: Michael Krieger, Miami Beach, FL (US); Kevin Ellsworth, Alva, FL (US)

(73) Assignee: Black & Decker Inc., Newark, DE (US)

( * ) Notice: Subject to any disclaimer, the term of this patent is extended or adjusted under 35 U.S.C. 154(b) by 235 days.

(21) Appl. No.: 11/970,829

(22) Filed: Jan. 8, 2008

(65) Prior Publication Data
US 2008/0165520 A1 Jul. 10, 2008

Related U.S. Application Data

(62) Division of application No. 11/395,325, filed on Apr. 3, 2006, now Pat. No. 7,338,328.

(60) Provisional application No. 60/667,050, filed on Apr. 1, 2005.

(51) Int. Cl.
*B60L 1/00* (2006.01)
*B60L 3/00* (2006.01)
*H02G 3/00* (2006.01)

(52) U.S. Cl. .................................................... 307/9.1
(58) Field of Classification Search ................. 307/154, 307/9.1; 439/668
See application file for complete search history.

(56) References Cited

U.S. PATENT DOCUMENTS

2009/0094663 A1* 4/2009 Ben-Yaacov et al. ........ 725/141

* cited by examiner

*Primary Examiner*—Albert W Paladini
*Assistant Examiner*—Carlos Amaya
(74) *Attorney, Agent, or Firm*—Stephen R. Valancius; Bruce S. Shapiro (57) ABSTRACT

A CLA device comprises a CLA plug that is insertable into an external CLA socket, for example, a DC CLA socket inside a vehicle. The CLA device has a housing coupled to the CLA plug, for example, by integration or via a tethered wire, with the housing having a support surface. A port interface connector in the CLA device engages with a complementary port interface connector of an external device at a cantilevered support point when the external device is attached to the CLA device.

4 Claims, 7 Drawing Sheets

CIGARETTE LIGHTER ADAPTER DEVICE THAT INTERFACES WITH AN EXTERNAL DEVICE VIA A PORT INTERFACE

CROSS-REFERENCE TO RELATED APPLICATIONS

The present application is a divisional of U.S. application Ser. No. 11/395,325 filed Apr. 3, 2006, now U.S. Pat. No. 7,338,328, which claims benefit of U.S. Provisional Application No. 60/667,050, filed Apr. 1, 2005. The disclosures of the above applications are incorporated herein by reference.

FIELD OF THE INVENTION

The present invention generally relates to cigarette lighter adapter devices (CLA devices) and more particularly to CLA devices that have input-output port interfaces, such as USB, etc.

DESCRIPTION OF THE PRIOR ART

CLA devices take advantage of power provided by the battery of a vehicle, e.g., car, boat etc, for providing various functionalities. In its simplest form, a CLA device is a cigarette lighter that is powered by the external battery via a CLA socket inside the vehicle.

CLA devices have also been used to power and charge external devices, such as mobile phones, audio players, etc. Also known are CLA inverters that convert the DC voltage supplied by the external battery to AC power. Typically, a CLA inverter includes power conversion circuitry that provides sufficient output power for operating portable computers, TVs, etc. Such CLA inverter supplies the AC power via an AC outlet disposed on the housing of the device. For example, a known CLA inverter device has both an AC outlet and a CLA socket, which provides a 12V DC output.

Another known CLA device integrates an FM transmitter to allow audio from an external audio source (e.g., MP3, CD player, etc.) to be heard via an external radio receiver in the vehicle. The CLA device has a housing with a CLA plug that is inserted into a corresponding CLA socket to power the transmitter circuitry. The housing includes an audio socket for receiving audio signals provided via an audio jack from the external audio source. The transmitter radiates an audio modulated FM signal that is received by the external radio receiver. The received signal is demodulated at the receiver, which is tuned to the FM frequency of the transmitter, to play the audio signal via vehicle speakers.

Still another known CLA device is described in U.S. Pat. No. 6,591,085 B1 issued to Grady. This CLA device includes an FM transmitter and power supply/charging assembly that is electrically coupleable to an external MP3 player, such as an Apple iPOD. The assembly includes a modular docking unit having a main body portion with a docking cavity. As such, the external MP3 player in Grady patent is supported in a substantially vertical orientation by the back surface and the cavity of the main body, without any support being provided by the coupling means itself. The main body portion contains the FM transmitter and power/charging circuitry that is electrically coupled to a DC power source via a CLA plug. A coupling means in the docking cavity connects the MP3 player with the FM transmitter and power/charging circuitry. The assembly transmits electrical power through the modular docking unit and the power/charging circuitry to power/charge the MP3 player.

Yet another known CLA devices is described in U.S. Pat. No. 6,612,875 as a multifunctional car adapter having a main body with chambers for a CLA plug and a CLA socket. A circuit board disposed in the main body is electrically coupled to the CLA plug for interfacing with a Universal Serial Bus (USB) port that is used for charging an external device connected to the USB port.

One more known CLA device has a USB port interface that is used for attaching an external USB storage device. The external USB storage device stores MP3 audio files that could be accessed by an MP3 audio player inside the CLA device, which applies its output to an integrated FM transmitter that transmits the audio signal to be played by an external receiver. The USB port interface of this CLA device comprises a USB socket connector that engages with a complementary USB plug connector of the external device.

A conventional port interface connector of the CLA device is arranged such that an attached external device, e.g., a USB memory stick, longitudinally extends outwardly from the CLA device in a cantilevered manner. In other words, the external device acts as a projecting member supported at only one end without any other supporting element. Under this arrangement, the external device is mechanically supported at the one end only by the engagement of the complementary connectors of the port interfaces (e.g., male plug on the external device and female socket on the CLA device). However, depending on the operating conditions, the conventional cantilevered support used for attaching the external device to the CLA device may not be strong enough to hold the external device securely in place, particularly inside a vehicle that is subject to various sources of vibration and/or sudden jolt.

With the ever increasing availability of functionalities, particularly, in computing and communications, there exists a continuing need to take advantage of CLA devices for providing improved functionalities and operation.

SUMMARY OF THE INVENTION

Briefly, according to one aspect of the present invention, a CLA device comprises a CLA plug that is insertable into an external CLA socket, for example, a DC CLA socket inside a vehicle. The CLA device has a housing coupled to the CLA plug, for example, by integration or via a tethered wire, with the housing having a support surface. A port interface connector in the CLA device engages with a complementary port interface connector of an external device at a cantilevered support point when the external device is attached to the CLA device. The cantilevered support point comprises a point where the external device is supported at one end by the complementary engagement of the port interface connectors of the CLA device and the external device. Examples of such port interfaces include USB, Firewire and Universal port interfaces. A protruding portion relative to the support surface positions the port interface connector relative to the support surface such that it supports the external device against movement when the complementary port interface connectors of the CLA and external devices are engaged. The CLA device could also include a resource device that exchanges data with the external device via the port interface.

According to another aspect of the present invention, the CLA device provides multiple functionalities, e.g., DC/DC or DC/AC power inverter, FM transmitter, various I/O port interfaces, and resources by enclosing the means that provide these functionalities in a single unit. As such, unlike the above-described prior art approaches that use separate functions, the CLA device of the present invention integrates multiple functionalities. More specifically, the CLA device of this aspect of the invention includes an inverter that converts an external DC voltage to an AC output voltage at an AC outlet. It further includes a radio frequency transmitter, such as an FM transmitter, that transmits an input audio signal to an external receiver, and at least one port interface that energizes and/or exchanges data with an attached external device.

According to some of the more detailed features of this aspect of the invention, the CLA device further comprises a resource device functioning as at least one of a port interface, an imaging device, a storage device, an audio device, and a video device. In addition, the CLA device could include a CLA socket for providing a DC output.

According to another aspect of the present invention, an accessory device comprises a housing that encloses an FM transmitter that is powered by one or more rechargeable batteries. The accessory device includes a port interface connector, such as a USB connector, a Firewire connector or a Pin Port connector, that is used for charging the one or more rechargeable batteries via a charger circuit. Additionally, the accessory device could include a satellite receiver that provides an audio signal used to modulate a carrier frequency for radiating modulated RF signals by the FM transmitter. The audio signal can be either an internal audio signal from an internal source or an external audio signal provided by an external source.

DESCRIPTION OF THE INVENTION

Figure 1:
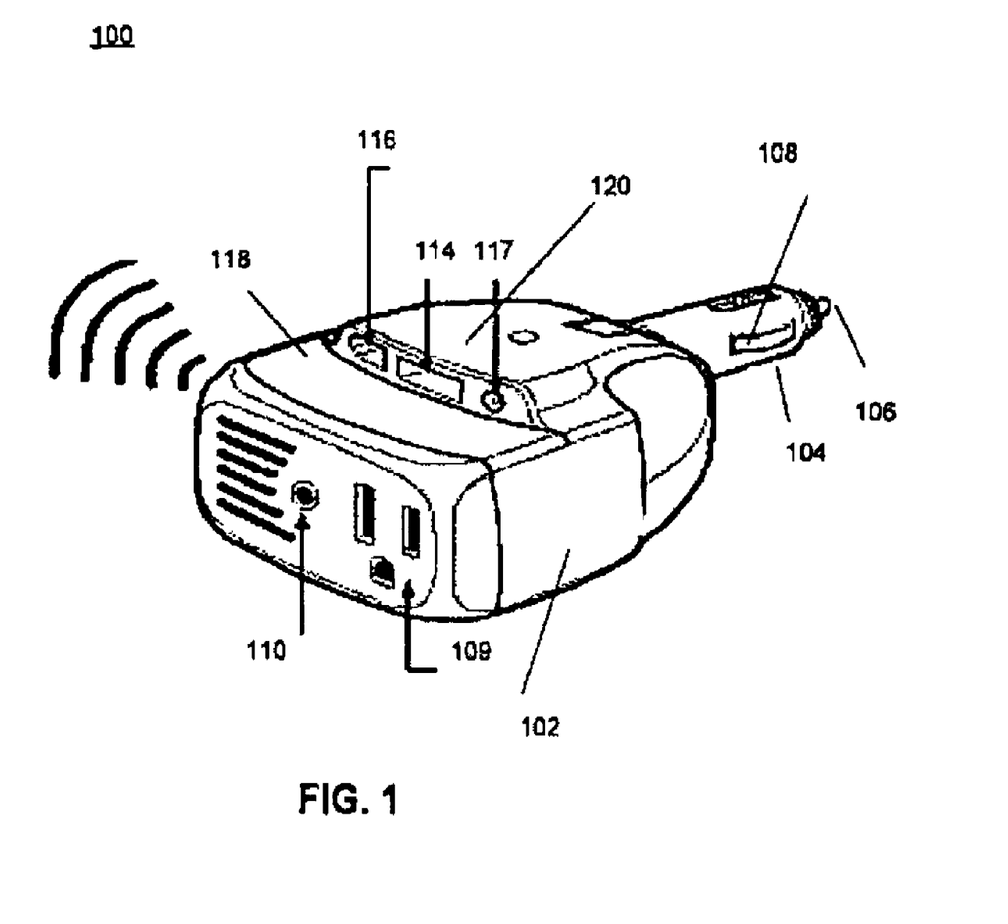
FIG. 1 shows an exemplary diagram of a CLA device according to one embodiment of the present invention.

FIG. 1 shows a diagram of an exemplary CLA device 100 in accordance with one aspect of the present invention. As described further in detail, the CLA device of FIG. 1 integrates a number of functionalities in a single device. As can be seen, the CLA device includes a housing 102 that is coupled to a CLA plug 104. The CLA plug 104 is adopted for insertion into an external CLA socket (not shown) for applying an external DC source, for example, the battery of a vehicle or any other type of suitably generated external DC source, to power various functionalities in accordance with the present invention. In the exemplary embodiment, the CLA plug 104 is coupled to the housing 102 by a pivoting arrangement for providing flexibility during insertion. As shown, the CLA plug 104 includes a center protruding pin 106 that upon insertion couples to a corresponding center contact of the external socket (not shown) to electrically connect with the positive terminal of the external DC source. Elongated spring contacts 108 disposed on the sides of the CLA plug provide the ground connection via the side walls of the external CLA socket.

In this exemplary embodiment, the housing 102 encloses the circuitry that provide the integrated functionalities of the present invention. Among other things, the CLA device 100 integrates inverter circuitry (shown in FIG. 6) for providing AC as well as DC output voltage. The housing 102 encloses circuitry that converts the external DC voltage to a sufficient AC level (e.g., 110 V or 220 V) for operating AC-powered devices via an AC outlet 109 that is disposed on the front side of the housing.

Figure 2:
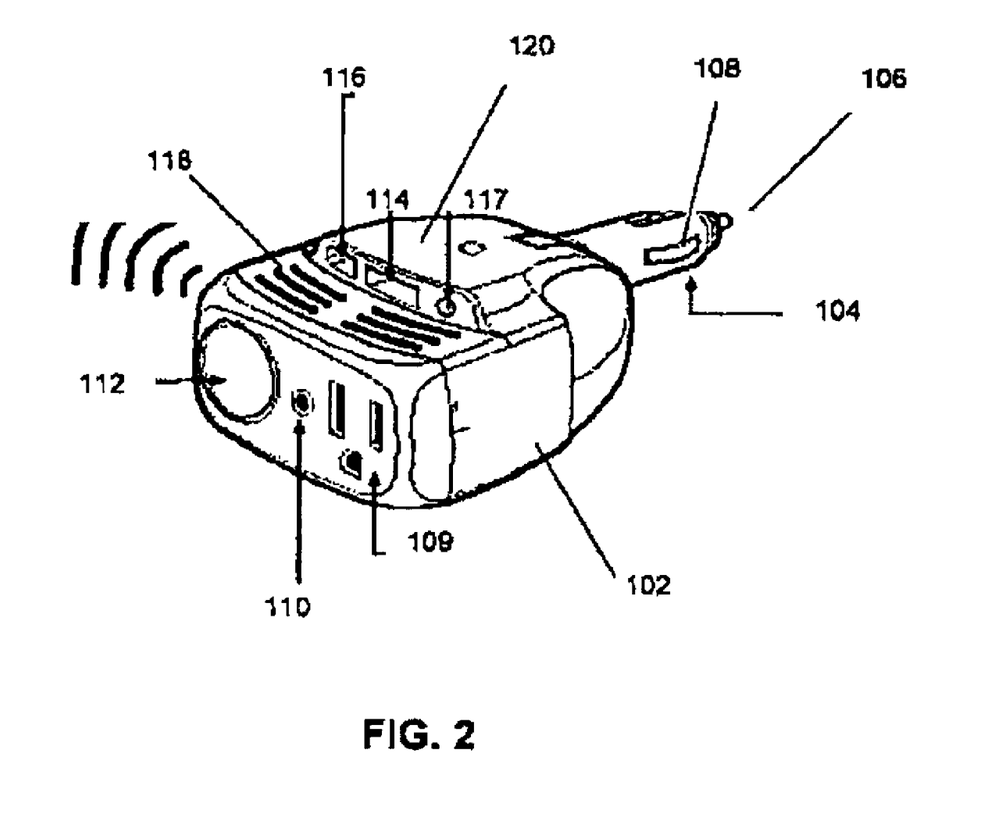
FIG. 2 shows another exemplary diagram of a CLA device according to another embodiment of the present invention.

The CLA device 100 also includes a transmitter (shown in FIG. 6) for transmitting radio frequency signals that can be received by an external radio receiver (not shown), such as an AM, FM, or satellite band receiver, which is tuned to the transmit frequency of the transmitter. The housing 102 also encloses the circuitry that modulate carrier signals, preferably, within the commercial band, e.g., AM, FM, S-band, by an audio input signal supplied by an external audio source. As shown, an audio-in port 110 is disposed on the front side of the housing 102 to allow for insertion of an audio plug that applies the external audio signal to the transmitter. FIG. 2 shows another exemplary embodiment of the present invention that provides all functionalities of the CLA device of FIG. 1. In addition, the CLA device of FIG. 2 includes a CLA socket 112 for outputting a DC voltage.

The CLA devices shown in FIGS. 1 and 2 also provide port interface functionalities for interfacing with one or more external devices (not shown). For example, the CLA devices of FIGS. 1 and 2 include circuitry for charging the external devices via energy supplied from such port interface connectors 114, 116 and 117, such as Universal, USB or Firewire connectors respectively. In addition to charging the external devices, the Universal, USB or Firewire connectors 114, 116, and 117 can be used to exchange data with one or more resource devices disposed within the CLA devices of FIGS. 1 and 2, such as USB Host or Device controllers, storage devices as well as audio, imaging, multi-media, or video devices.

According to one aspect of the present invention, a robust support system is provided for supporting external devices that attach to the CLA devices of the invention via one or more port interfaces. More specifically, the housing 102 includes a support surface 118 for supporting attached external devices (not shown) against any movement. Situated relative to the support surface 118 is a protruding portion 120, which in this exemplary embodiment, extends upwardly from at least at least a portion of the top side of the housing 102. As shown, the protruding portion 120 is positioned to enclose the connector of the USB, Firewire and Universal connectors 114, 116, and 117 such that external devices that attach to the CLA device could be supported by the support surface 118 of the housing 102. The point at which the port interface connector of the CLA device engages a complementary port interface connector of the external device comprises a cantilevered support point when the external device is attached to the CLA device. Therefore, the cantilevered support point according to this embodiment comprises a point where the external device is supported at one end by the complementary engagement of the port interface connectors of the CLA device and the external device. As can be seen, the system for supporting the external device according to the present invention provides two support points. A support point is provided at the cantilevered support point. The other support point comes into play when there is a movement by the external device, which is provided by the support surface 118 of the housing 102. Consequently, this arrangement provides a robust mechanical support mechanism for the external device, which in addition to being supported by the complementary engagement of the connectors of the port interfaces of the CLA device and the external device is also supported by the support surface of the housing against a movement. It should be noted that the support point provided by the support surface does not necessarily implies that the external device should always rest or otherwise touch the support surface. Rather such support surface provides support when there is a movement by the external device, for example because of vibration or jolt. Thus, if needed, the support provided by the support surface of the housing may be momentary in nature and not continuous.

Figures 3A, 3B:
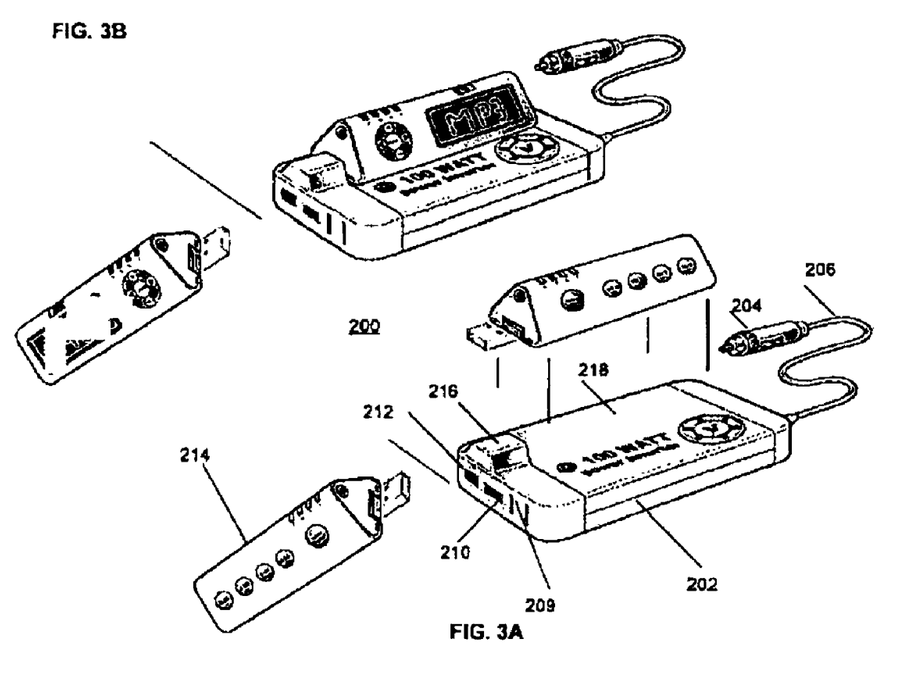
FIGS. 3A and 3B show still another exemplary embodiment of a CLA device according to yet another embodiment of the present invention.

FIGS. 3A and 3B show still another embodiment 200 of the CLA device of the present invention, where depending on the operational requirements, an attached external device could either be supported in the cantilevered manner (by extending longitudinally outward from one of the peripheral sides of the CLA device) or it can be supported by the support surface of the housing according to this aspect of the present invention. As shown in FIG. 3A, this embodiment comprises a slim housing 202 that encloses a power inverter (shown in FIG. 6). In this embodiment, the slim housing 202 is couple to a CLA plug 204 via a tethered wire 206. A fan disposed on the housing is used to cool the internal circuitry of the CLA device. As shown, the front side of the housing 202 includes an AC outlet 209 as well as USB and Firewire port interfaces 210 and 212, respectively, which comply with corresponding mechanical and electrical specifications and standards. As can be seen, the USB and Firewire port interfaces 210 and 212 on the front side have corresponding connectors that engage with complementary connectors of USB/Firewire external devices, e.g., an MP3 player, extending longitudinally outward from the CLA device. Under this arrangement, an exemplary external device 214 is mechanically supported in the cantilevered manner by the engagement mechanism of the complementary connectors of the port interfaces (male on the external device and female on the CLA device or vice versa). In addition, the CLA device includes a protruding portion 216 relative to a support surface 218 of the housing 202. The protruding portion 216 extends upwardly from the support surface 218, which in this embodiment is shown to be on the top side of the slim housing. However, depending on application and design requirements, the support surface could be on other sides of the housing. Moreover, the support surface shown in FIG. 3A comprises a flat surface. However, depending on application and design requirements, the support surface 218 could be sloped, slanted, curved or of any other suitable shape. The protruding portion 216 positions the connectors of the USB/Firewire port interfaces (shown in this exemplary embodiment as female sockets, but it could be the other way around) such that the external device is supported by the support surface 218 when attached to the CLA device. More specifically, when the complementary connectors of the port interfaces of the CLA device and external device are engaged at the cantilevered support point, the support surface supports the external device against a movement caused by ambient factors, such as vibrations and jolts.

FIG. 3B depicts the external device 214 being attached to the CLA device with respective complementary port interface connectors engaged at the cantilevered support point. As can be seen, the external device in addition to the cantilevered support point is substantially supported by the support surface 218 of the slim housing against a movement. This embodiment of the invention allows for attaching external devices to the CLA device and supporting the attached devices via the cantilevered support point as well as the support surface of the slim housing. Thus, this aspect of the invention provides a robust mechanical support mechanism for the external device. The support is not only provided by the mechanical engagement of complementary connectors of port interfaces (e.g., male plug and female socket), but also by the support surface of the slim housing.

Figure 4:
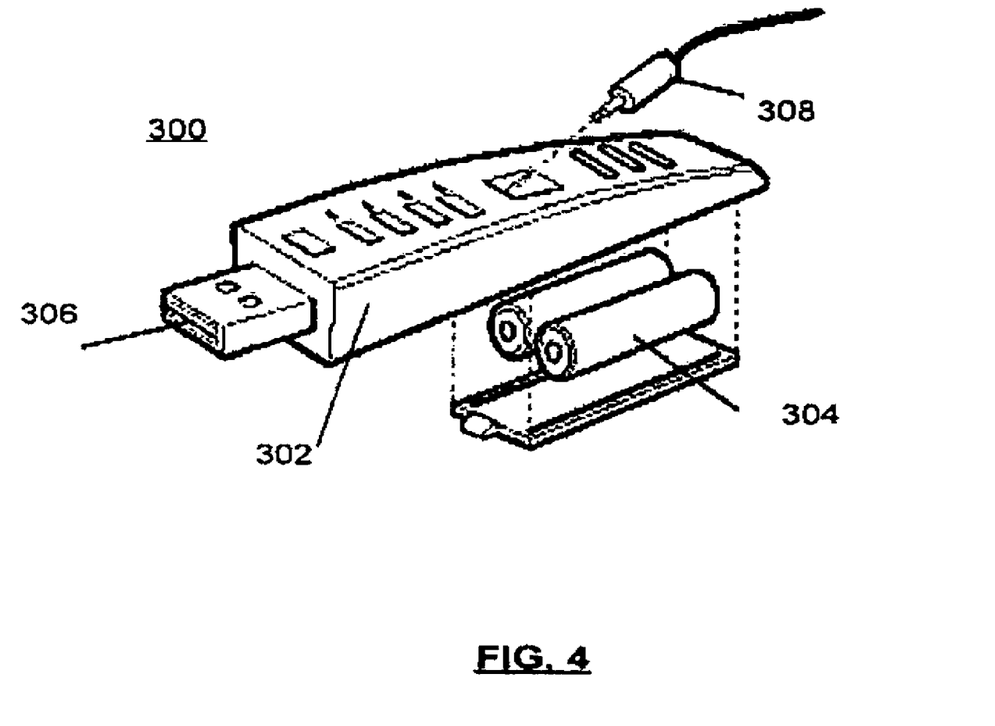
FIG. 4 shows an accessory device according to another aspect of the present invention.

FIG. 4 shows a diagram of an external accessory device 300 according to another aspect of the invention. The external accessory device 300 according to this aspect of the present invention comprises a housing 302 for enclosing a transmitter (shown in FIG. 7), such as an FM transmitter, and one or more rechargeable batteries that power the transmitter. The external accessory device also includes a port interface connector 306 that is used to supply charge energy or power for recharging the one or more batteries. In one embodiment, the FM transmitter receives an external audio signal, for example one supplied from an external audio player via an audio cable 308, for radiating audio modulated radio frequency signals on a carrier frequency. In another embodiment, the external accessory device also includes an internal satellite receiver (shown in FIG. 7), such as an XM or Sirrus satellite radio, within its housing 302. Under this arrangement, the FM transmitter receives an internal audio signal from the satellite receiver for modulating the radio frequency carrier signal on a selected frequency.

Figure 5A:
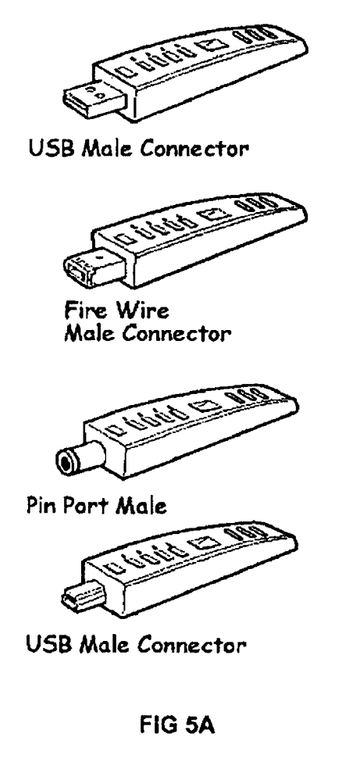
FIGS. 5A and 5B show exemplary embodiments of the accessory device of the invention.
Figure 5B:
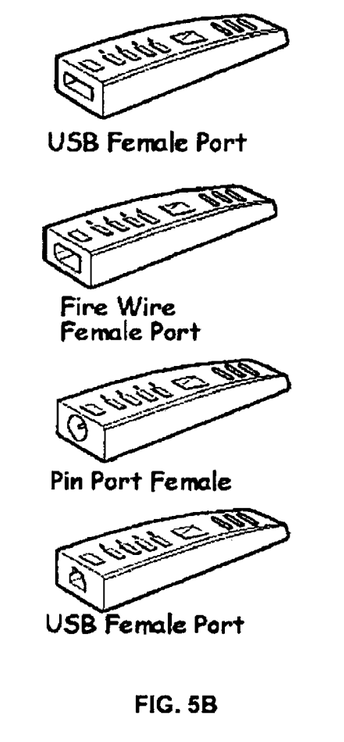

FIGS. 5A and 5B depict various exemplary embodiments of the external accessory device of the present invention with different exemplary port interface connector configurations. FIG. 5A shows various embodiments where the port interface connector is a male USB, Fire Wire, or Pin Port connector. FIG. 5A shows various embodiments where the port interface connector is a female USB, Fire Wire, Pin Port connector.

Figure 6:
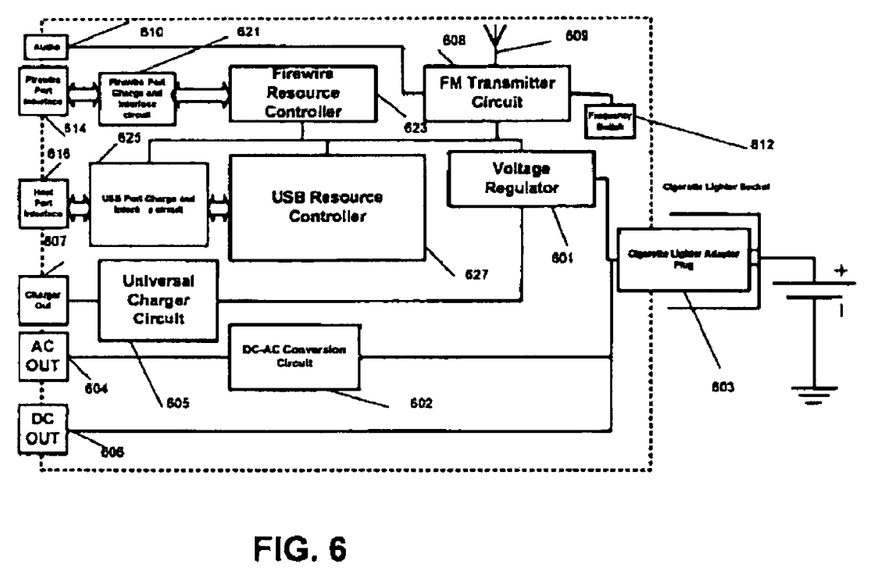
FIG. 6 shows a block diagram for a CLA device according to one aspect of the present invention.

FIG. 6 shows a block diagram 600 of the CLA device of the present invention. The CLA device includes DC-to-AC power conversion circuit 602 for providing an AC voltage at an AC outlet 604. A voltage regulator 601 coupled to a CLA plug 603 provides appropriately regulated voltage to a universal charger circuit 605, which provides charge energy for charging externally attached devices at a charger outlet 607. Optionally, the CLA device also includes circuits for transferring the external DC voltage via a DC outlet 606 to one or more CLA sockets that could be used for plugging external CLA devices, such as cigarette lighters, etc. The CLA device also includes a transmitter 608, e.g., AM, FM, or S-band transmitter, that receives an external stereo audio signals through an audio-in port 610. The transmitter 608 includes well known modulation, RF power and antenna 609 for radiating a modulated RF signal at a carrier frequency signal having a power level that is in compliance with governing emission rules promulgated by an applicable government agency such as the FCC in the United States and its equivalents in other countries. A frequency switch 612 can be used to select the carrier frequency for the FM transmitter 608.

The CLA device includes port interfaces 614 and 616 that allows for sharing internal resources with external devices. As stated above, in one embodiment, the charge circuitry provides the energy for charging the external devices via one or more port interfaces. Battery charging via USB or Firewire ports is known. Besides directly powering USB devices, Dallas Semiconductor discloses the use of MAXIM chips, e.g., MAX 1692 and MAX 1722, MAX 1874, MAX 1555, with USB power to perform battery charging. As such portable devices, like MP3 players, can be attached to the CLA device for battery charging and data exchange simultaneously and over one cable.

In one embodiment, the CLA device also includes one or more resource devices that interface with the external device via the port interface. Such resource devices Firewire and USB resources. The Firewire resources comprise Firewire charge and port interface circuit 621 that operate under the control of a Firewire resource controller 623. The USB resources comprise USB charge and port interface circuit 625 that operate under the control of a USB resource controller 627. The resource device circuit could be used to perform various functions, such as port interface, imaging, media storage, audio, video, etc., functions. In one embodiment, the one or more resource devices could comprise USB Host and USB device controllers, as is well known in the art. Other examples of the one or more resource devices include one or more storage devices, audio devices, multi-media devices, imaging devices, or video devices. Therefore, the port interface of the CLA device can be used to provide charge energy or power energy to the external device as well as exchanging data with such device.

The external device (not shown) may be a stand alone device, such as a battery powered device, or an external device that is AC or DC powered, for example via the AC and DC outlets 604 and 606 provided by the CLA device. The external device can comprise a wide variety of devices providing port interface capability with the CLA device of the present invention. For example, the external device can be a computing device, a media player device or any device that provides a suitable port interface with the portable accessory device for exchange of data.

It will be appreciated that enclosing multiple functions into the same housing facilitates interfacing external devices with the CLA device of the present invention. Thus, in the disclosed exemplary embodiment, the CLA device provides multiple functionalities, e.g., radio frequency transmitter, charging, AC/DC power supply function, port interface functions, etc., by enclosing the means that provide these functionalities along with the port interface in a single housing.

Figure 7:
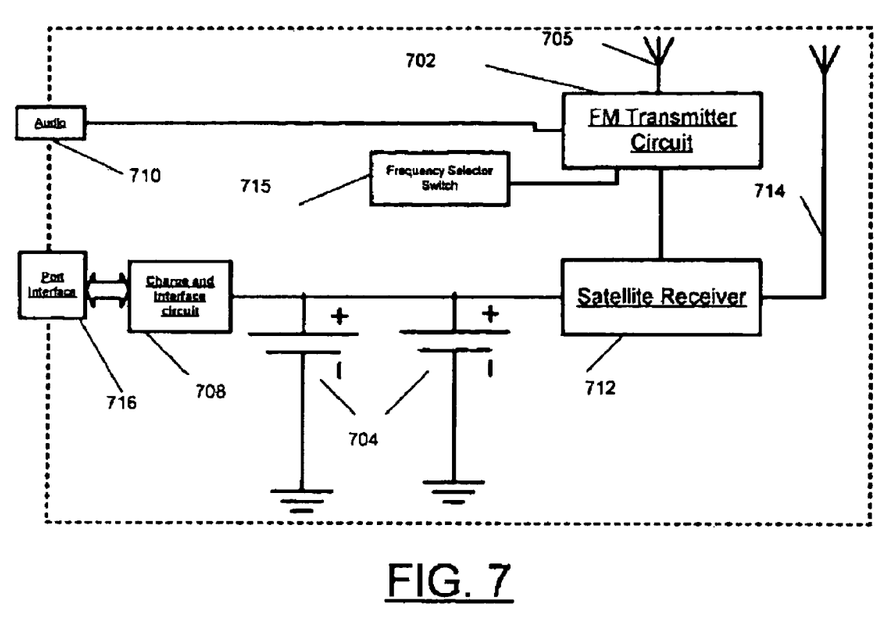
FIG. 7 shows a block diagram for an accessory device according to another aspect of the present invention.

Referring to FIG. 7, a block diagram 700 of the external accessory device of the present invention is shown. The external accessory device includes an FM transmitter 702 that is powered by one or rechargeable batteries 704 that are enclosed within the housing of the external accessory device. The external accessory device further includes a port interface connector 716 that is used to charge the one or more rechargeable batteries. The port interface connector can be a USB, Firewire, pin port male or female connector that can be connected to an external power source through a complementary connector. The external power source provides the energy for charging the batteries through a charge circuit 708, such as Dallas Semiconductor devices referenced above. As such, the charge circuit 708 provides the energy for charging the external accessory devices via the port interface connector 706, when it is coupled to a device having an external power source, such as USB, Firewire, or a power supply device.

The FM transmitter 702 powered by the rechargeable batteries 704 modulates an applied audio signal on a carrier frequency where the generated radio frequency signal is radiated via a transmit antenna 705. The applied audio signal can be an external audio signal provided to the accessory device via an external audio port 710 that could couple to a complementary port of an external audio device, such as an MP3 or CD player, etc. In addition, the external accessory device could include a satellite radio receiver 712 having a receive antenna 714 for receiving broadcast satellite audio signals. The satellite receiver 712 demodulates the broadcast audio signal and applies the demodulated audio as an input to the FM transmitter 702 for transmission on the selected carrier frequency. The accessory device of the present invention could include a frequency switch 715 for selecting a desired carrier frequency.

The invention has been described in detail with respect to referred embodiments, and it will now be apparent from the foregoing to those skilled in the art, that changes and modifications may be made without departing from the invention in its broader aspects, and the invention, therefore, as defined in the appended claims, is intended to cover all such changes and modifications that fall within the true spirit of the invention.

The invention claimed is:

1. An accessory device that is attachable to a vehicle adapter device, comprising:
    an accessory device including
        a FM transmitter powered by one or more rechargeable batteries, the FM transmitter configured to receive an audio signal and generate a radio frequency signal modulated with the audio signal;
        an accessory housing that encloses the FM transmitter;
        a port interface connector in the housing that is attachable to a vehicle adapter device; and
        charging circuit coupled to the port interface connector for receiving power and to provide charge energy to the one or more rechargeable batteries; and
    the vehicle adapter including
        a cigarette lighter type plug for insertion into a cigarette lighter type socket;
        an inverter circuit electrically coupled to the plug for converting a DC input voltage from the plug into an AC output signal;
        an adapter housing coupled to the plug and providing a horizontal support surface for the accessory device; and
        a complementary port interface supported by the adapter housing, where the complementary port interface couples with the port interface of the accessory such that the accessory device extends outward horizontally outward from the complementary port interface and engages with the support surface of the adapter housing.

2. The accessory device of claim 1, further including a satellite receiver that provides the audio signal.

3. The accessory device of claim 1, wherein the audio signal comprise at least one of an internal audio signal and an external audio signal.

4. The accessory device of claim 1, wherein the port interface connector comprises at least one of a USB connector, a Firewire connector, and a Pin Port connector.

* * * * *